US009189771B2

(12) United States Patent
Watanabe

(10) Patent No.: US 9,189,771 B2
(45) Date of Patent: Nov. 17, 2015

(54) CLIENT APPARATUS, SERVER APPARATUS, DOCUMENT MANAGEMENT SYSTEM, DOCUMENT MANAGEMENT METHOD, AND MEDIUM STORING PROGRAM THEREOF

(71) Applicant: Ryutaro Watanabe, Tokyo (JP)

(72) Inventor: Ryutaro Watanabe, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 308 days.

(21) Appl. No.: 13/625,687

(22) Filed: Sep. 24, 2012

(65) Prior Publication Data
US 2013/0018962 A1 Jan. 17, 2013

Related U.S. Application Data

(62) Division of application No. 12/573,502, filed on Oct. 5, 2009, now abandoned.

(30) Foreign Application Priority Data

Oct. 23, 2008 (JP) .................................. 2008-273401

(51) Int. Cl.
*G06F 7/00* (2006.01)
*G06Q 10/10* (2012.01)
*G06F 17/30* (2006.01)

(52) U.S. Cl.
CPC .......... *G06Q 10/10* (2013.01); *G06F 17/30011* (2013.01)

(58) Field of Classification Search
CPC .................................. G06F 17/30011
USPC .................. 707/690, 695, 728, 758
See application file for complete search history.

(56) References Cited

U.S. PATENT DOCUMENTS

| 6,192,381 | B1 | 2/2001 | Stiegemeier et al. |
| 6,680,675 | B1* | 1/2004 | Suzuki .......................... 340/988 |
| 7,035,910 | B1 | 4/2006 | Dutta et al. |
| 2004/0088313 | A1 | 5/2004 | Torres |
| 2005/0033813 | A1 | 2/2005 | Bhogal et al. |

(Continued)

FOREIGN PATENT DOCUMENTS

| JP | 10-11507 A | 1/1998 |
| JP | 2000123071 A | 4/2000 |
| JP | 2004-185556 A | 7/2004 |
| JP | 2006-18529 A | 1/2006 |

OTHER PUBLICATIONS

Kreifelts et al., ECSCW '93, Proc. Third European Conference on Computer-Supported Cooperative Work Sep. 15-17, 1993, Milano, Italy, pp. 1-16.*

(Continued)

*Primary Examiner* — Cheyne D Ly
(74) *Attorney, Agent, or Firm* — Fitzpatrick, Cella, Harper & Scinto

(57) ABSTRACT

A client generates a list associating a document, an operation for the document, and a user and transmits the list to a server. When an operation for the document is received from a user, the client acquires information including a document, an operation for the document, and a user and transmits the information to the server. The server receives and stores the list from the client, receives the information from the client, searches storage unit for a list including information matching the information, and transmits the list to the client. The client receives and displays the searched list.

5 Claims, 13 Drawing Sheets

(56) References Cited

U.S. PATENT DOCUMENTS

| | | |
|---|---|---|
| 2005/0097061 A1* | 5/2005 | Shapiro et al. .................. 705/67 |
| 2007/0050368 A1 | 3/2007 | Watanabe |
| 2007/0255594 A1* | 11/2007 | Muehlmeier et al. ............. 705/2 |
| 2009/0187453 A1* | 7/2009 | Dill et al. ......................... 705/9 |
| 2009/0235182 A1 | 9/2009 | Kagawa et al. |

OTHER PUBLICATIONS

Japanese Office Action dated Feb. 12, 2013, in corresponding Japanese Application No. 2008-273401.

* cited by examiner

FIG. 4

| ID | TARGET OPERATION | TARGET USER | TARGET DOCUMENT | COMMENT |
|---|---|---|---|---|
| 1 | EDIT | Robert | PRESENTATION A.ppt | CORRECT P.3. |
| 2 | MOVE DOCUMENT | Anne | REPORT.doc | MOVE TO LOCATION HIDDEN FROM DEVELOPERS. |
| 3 | SET ACCESS RIGHT | Anne | INVOICE.doc | ADD Robert. |
| 4 | ADD TAG | John | LIST.xls | FOLLOW RULES OF ADMINISTRATION DEPARTMENT. |
| 5 | EDIT | John | PRESENTATION A.ppt | CORRECT P.5. |

F I G. 8

| RELATED ID | TARGET OPERATION | RELATED OPERATION |
|---|---|---|
| 1 | DISPLAY DOCUMENT | EDIT |
| 2 | DISPLAY PROPERTY | SET ACCESS RIGHT |

F I G. 10
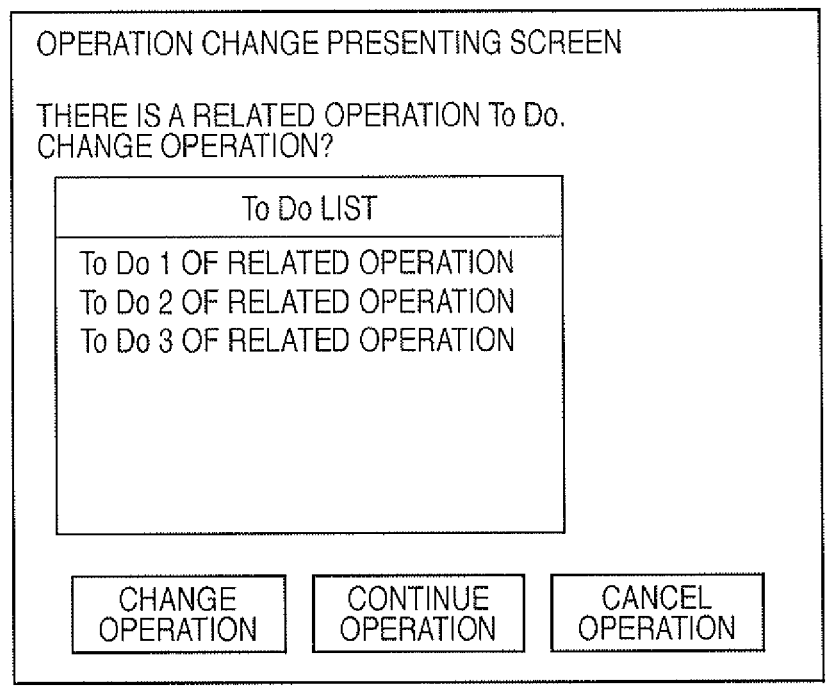

| ID | TARGET USER | TARGET DOCUMENT | COMMENT |
|---|---|---|---|
| 1 | Robert | PRESENTATION A.ppt | CORRECT P.3. |
| 2 | Anne | REPORT.doc | MOVE TO LOCATION HIDDEN FROM DEVELOPERS. |
| 3 | Anne | INVOICE.doc | ADD Robert. |
| 4 | John | LIST.xls | FOLLOW RULES OF ADMINISTRATION DEPARTMENT. |
| 5 | John | PRESENTATION A.ppt | CORRECT P.5. |

CLIENT APPARATUS, SERVER APPARATUS, DOCUMENT MANAGEMENT SYSTEM, DOCUMENT MANAGEMENT METHOD, AND MEDIUM STORING PROGRAM THEREOF

This application is a divisional of application Ser. No. 12/573,502, filed Oct. 5, 2009 (pending), the contents of which are incorporated by reference herein.

BACKGROUND OF THE INVENTION

1. Field of the Invention

The present invention relates to a client apparatus and a server apparatus that manage documents used in a workflow, a document management system, a document management method, and a medium storing a program thereof.

2. Description of the Related Art

Electronic documents constitute the center of work, and there is an increased need for a system that can associate and manage the electronic documents and the work. An example of generally known solving means includes a workflow system. In the workflow system, a flow of work is defined in advance as a workflow, and documents necessary for the status of the defined workflow are attached to advance the process.

For example, as in an approval system, a workflow "create (regular employee)→scrutinize (section chief)→approve (department chief)" is created in advance. To process an authorization document, an application is attached to "create" of the flow, and approvals of the section chief and the department chief are provided to the document in "scrutinize" and "approve", respectively.

However, there are problems that details of the user rule or the flow need to be set in advance in the workflow system and that a large amount of man-hours is necessary to use the workflow system in small-scale work. There is also a problem that the system is expensive and large-scale because a workflow engine needs to be installed to control complicated flows.

In the workflow system, documents are included in the workflow. Therefore, there is a problem that although a document can be searched from the workflow, the workflow (work) that the document is processing cannot be searched from the document.

Therefore, in a small-scale user environment, a method is often implemented, in which a document management system and a To-Do list function thereof are used to simply associate the electronic documents and the work.

In such a system, each user can provide a flag, such as a To-Do flag, to the documents on the document management system and can also describe the work content. In such a system, documents with flag can be listed and displayed by use of To-Do folders, etc.

As a result, the user can set a flag to a document that needs to be processed and can describe the work content to be processed. The user can also check, as necessary, the list of the documents that need to be processed based on the To-Do folders. Therefore, the documents and the work that requires processing for the documents can be associated.

However, there is a problem that the combination of the document management system and the To-Do list can be used only as notes of individuals, and the workflow for passing the work from person to person cannot be realized.

To solve the problems, Japanese Patent Laid-Open No. 2000-123071 proposes a system in which other users can add items to the To-Do list.

SUMMARY OF THE INVENTION

However, in the conventional technique, one system manages things in different domains: a document-based document management system and a work-based To-Do list. Therefore, the operations of the two types of domains are not coordinated, and the operation needs to be intentionally switched between operation of documents and checking of To-Do list. Thus, there is a problem that the work of the To-Do list may be overlooked when a document-based operation, which is an original usage of the document management system, is performed.

Japanese Patent Laid-Open No. 2000-123071 describes consolidated management of individual tasks and group tasks in the To-Do list. However, the difference in operations between the document operation and the To-Do list management in the document management system is not particularly considered or described.

The present invention provides a client apparatus, a server apparatus, a document management system, a document management method, and a medium storing a program capable of reducing the burden of the user and efficiently processing necessary work when a document-based operation is executed in a document management system.

The present invention in its first aspect provides a document management system that includes a client apparatus and a server apparatus and that manages documents used in a workflow, the client apparatus comprising: a generating unit configured to generate a list associating a document, an operation for the document, and a user and to transmit the list to the server apparatus; and an acquisition unit configured to acquire information including a document, an operation for the document, and a user when the operation for the document is received from the user and to transmit the information to the server apparatus, the server apparatus comprising: a storage unit configured to receive the list from the client apparatus and to store the list; and a search unit configured to receive the information from the client apparatus and to search the storage unit for a list including information matching the information to transmit the list to the client apparatus, the client apparatus comprising: a display unit configured to receive and display the list searched by the search unit.

The present invention in its second aspect provides a document management method executed in a document management system that includes a client apparatus and a server apparatus and that manages documents used in a workflow, the method comprising: a generating step in the client apparatus for generating a list associating a document, an operation for the document, and a user and for transmitting the list to the server apparatus; a storage step in the server apparatus for receiving the list from the client apparatus and for storing the list; an acquisition step in the client apparatus for acquiring information including a document, an operation for the document, and a user when the operation for the document is received from the user and for transmitting the information to the server apparatus; a search step in the server apparatus for receiving the information and for searching a list including information matching the received information from the list stored in the storage step to transmit the list to the client apparatus; and a display step in the client apparatus for receiving and displaying the list searched in the search step.

The present invention in its third aspect provides a client apparatus used in a document management system that includes the client apparatus and a server apparatus and that manages documents used in a workflow, the client apparatus comprising: a generating unit configured to generate a list associating a document, an operation for the document, and a user and to transmit the list to the server apparatus; an acquisition unit configured to acquire information including a document, an operation for the document, and a user when the operation for the document is received from the user and to transmit the information to the server apparatus; and a display unit configured to receive and display the list searched by the server apparatus.

The present invention in its fourth aspect provides a server apparatus used in a document management system that includes a client apparatus and the server apparatus and that manages documents used in a workflow, the server apparatus comprising: a storage unit configured to receive a list generated in the client apparatus and to store the list; and a search unit configured to receive information including a document, an operation for the document, and a user who performed the operation from the client apparatus and to search the storage unit for a list including information matching the information to transmit the list to the client apparatus.

The present invention in its fifth aspect provides a computer-readable medium storing a document management program for managing documents used in a workflow in a document management system including a client apparatus and a server apparatus, the program causing a computer, which is the client apparatus, to perform functions to: generate a list associating a document, an operation for the document, and a user and transmit the list to the server apparatus; acquire information including a document, an operation for the document, and a user when the operation for the document is received from the user and transmit the information to the server apparatus; and receive and display a list searched by the server apparatus.

The present invention in its sixth aspect provides a computer-readable medium storing a document management program for managing documents used in a workflow in a document management system that includes a client apparatus and a server apparatus and that includes a memory for receiving and storing a list generated by the client apparatus, the program causing the server apparatus to perform functions to: receive information including a document, an operation for the document, and a user who performed the operation from the client apparatus and search the memory for a list including information matching the information to transmit the list to the client apparatus.

According to the present invention, the burden of the user can be reduced, and necessary work can be efficiently processed when a document-based operation is executed in a document management system.

Further features of the present invention will become apparent from the following description of exemplary embodiments with reference to the attached drawings.

BRIEF DESCRIPTION OF THE DRAWINGS

FIG. 4 is a diagram showing an example of the content of a To-Do list database;

FIG. 8 is a diagram showing an example of the content of an association database of a document operation according to a second embodiment;

FIG. 10 is a diagram showing an example of an operation change presenting screen;

DESCRIPTION OF THE EMBODIMENTS

Figure 1:
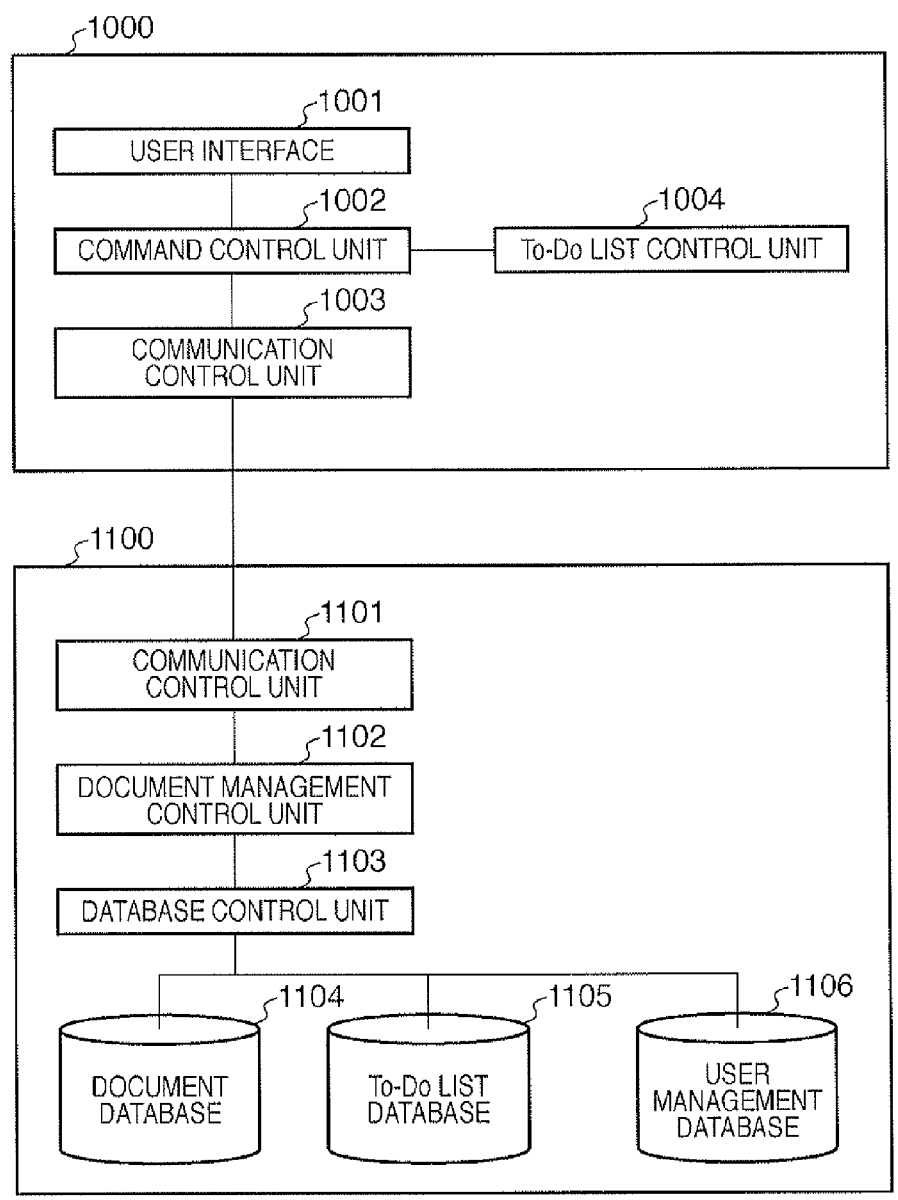
FIG. 1 is a diagram showing a configuration of a document management system according to a first embodiment of the present invention.

Preferred embodiments of the present invention will now be described in detail with reference to the drawings. The same constituent elements are designated with the same reference numerals, and the description will not be repeated.

FIG. 1 is a block diagram showing a system configuration in the embodiments according to the present invention. The present system is constituted by a client apparatus and a server apparatus. Client software 1000 is installed on the client apparatus of the document management system. Server software 1100 is installed on the server apparatus of the document management system. The software is operated on an OS of a computer (client apparatus or server apparatus) constituted by a CPU, a RAM, a ROM, an HDD, etc.

A user interface 1001 is a user interface unit. The system receives a user operation through the user interface 1001 and transmits the user operation to a command control unit 1002.

The command control unit 1002 uses a communication control unit 1003 and a To-Do list control unit 1004 according to an operation request of the user and returns the operation result to the user interface 1001. The communication control unit 1003 communicates with the server software 1100 according to a command of the command control unit 1002.

The To-Do list control unit 1004 controls a To-Do list according to a command of the command control unit 1002.

A communication control unit 1101 communicates with the client software 1000 according to a command of the document management control unit 1102.

The document management control unit 1102 uses a database control unit 1103 according to an operation request of the client software 1000 and returns the operation result to the client software 1000 through the communication control unit 1101.

The database control unit 1103 controls a document database 1104, a To-Do list database 1105, and a user management database 1106 according to a command of the document management control unit 1102.

The document database 1104 stores document information. The To-Do list database 1105 is a To-Do list database and stores To-Do list information. The user management database 1106 is a user management database and stores user information.

Figure 16:
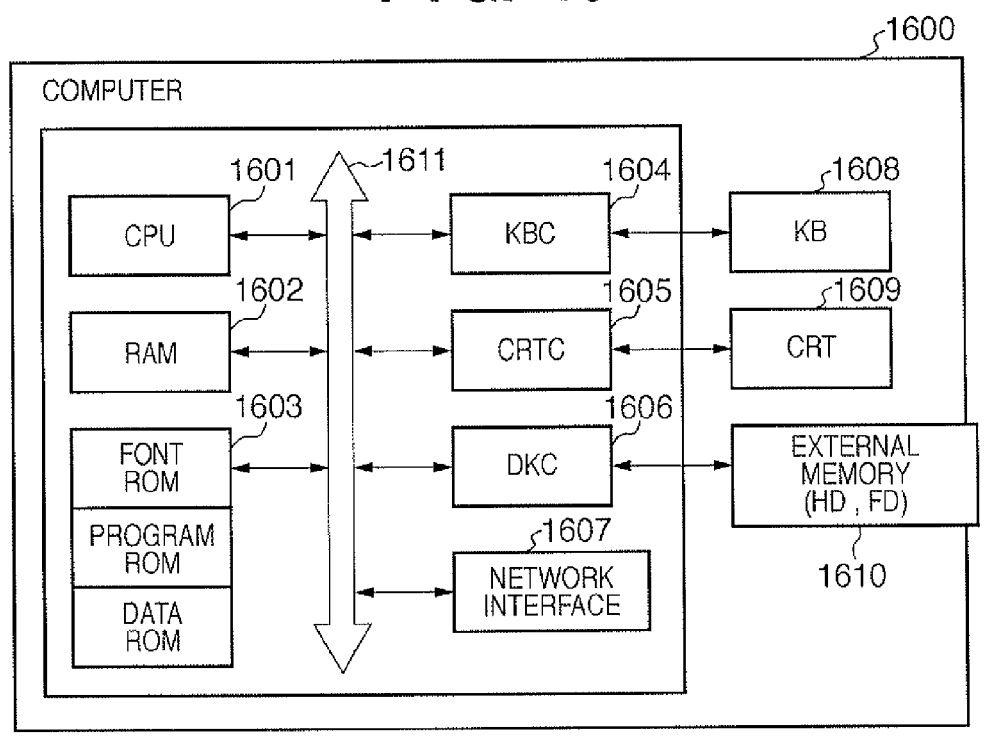
FIG. 16 is a diagram showing a configuration of an information processing apparatus applied to the document management system.

FIG. 16 is a diagram showing a configuration of a general information processing apparatus used in the client apparatus or the server apparatus of the present document management system.

A computer 1600 comprises a CPU 1601. Based on a ROM for programs of a ROM 1603, a document processing program stored in an external memory 1610, etc., the CPU 1601 controls document processing including the processes of the embodiments and controls the execution of a printing process or a print control process based on the document processing. The CPU 1601 comprehensively controls the components connected to a system bus 1611.

The ROM for programs of the ROM 1603 or the external memory 1610 stores an operating system program (hereinafter, "OS"), etc., as a control program of the CPU 1601. A ROM for fonts of the ROM 1603 or the external memory 1610 stores font data, etc., used for document processing. A ROM for data of the ROM 1603 or the external memory 1610 stores various data used for document processing, etc. A RAM 1602 functions as a main memory, a work area, etc., of the CPU 1601.

A keyboard controller (KBC) 1604 controls key input from a keyboard 1608 or a pointing device not shown. A CRT controller (CRTC) 1605 controls display by a CRT display (CRT) 1609. A disk controller (DKC) 1606 controls access to the external memory 1610 by a hard disk (HD), etc., that stores various programs or applications, etc. A network interface 1607 executes a communication control process with an external device through a network.

The CPU 1601 opens various windows registered in advance based on a command instructed by a mouse cursor not shown, etc., on the CRT 1609 and executes various data processing. For example, when the user executes printing, windows related to the print setting are opened, and settings, such as print setting and print mode selection, of a print processing method for the print control apparatus can be performed.

A conventional process will be described first.

A flow of a conventional To-Do list creation process will be described with reference to FIGS. 2, 12, and 13. The user first uses a To-Do list creation instruction screen shown in FIG. 2 to select documents through the client software 1000 and instructs creation of a To-Do list for the documents. After receiving a request of the user through the user interface 1001, the client software 1000 displays a To-Do list creation screen shown in FIG. 12 to the user, the screen displaying a comment input field.

After the user inputs comments and notifies that all input is finished, the client software 1000 receives the notification through the user interface 1001. Having received the notification, the client software 1000 notifies the reception and the user who created the To-Do list to the server software 1100 through the communication control unit 1003. After receiving the notification, the server software 1100 stores the created To-Do list in the To-Do list database 1105.

Figures 12, 13:
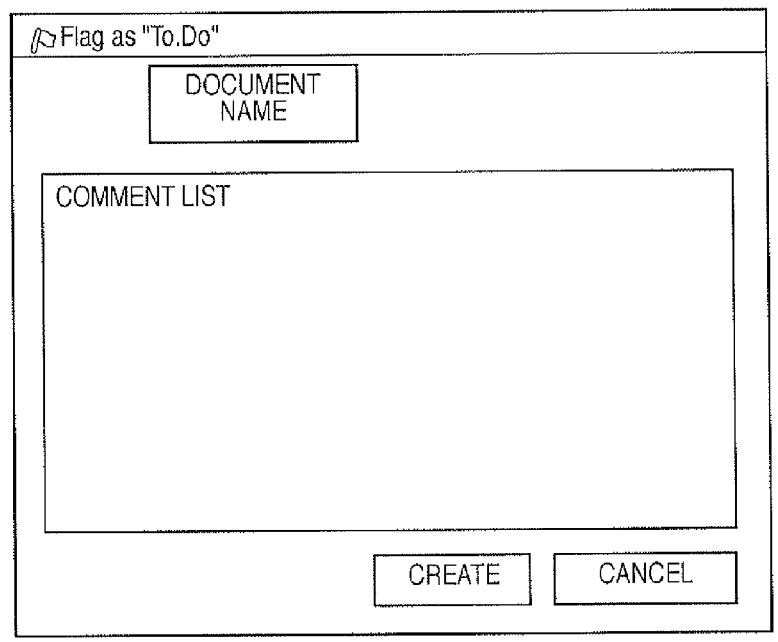
FIG. 12 is a diagram showing an example of a conventional To-Do list creation screen.
FIG. 13 is a diagram showing an example of the content of a conventional To-Do list database.

The To-Do list database created in the To-Do list database 1105 includes information as shown in FIG. 13. However, the target users and the target documents may be IDs that can uniquely identify the targets.

Figure 14:
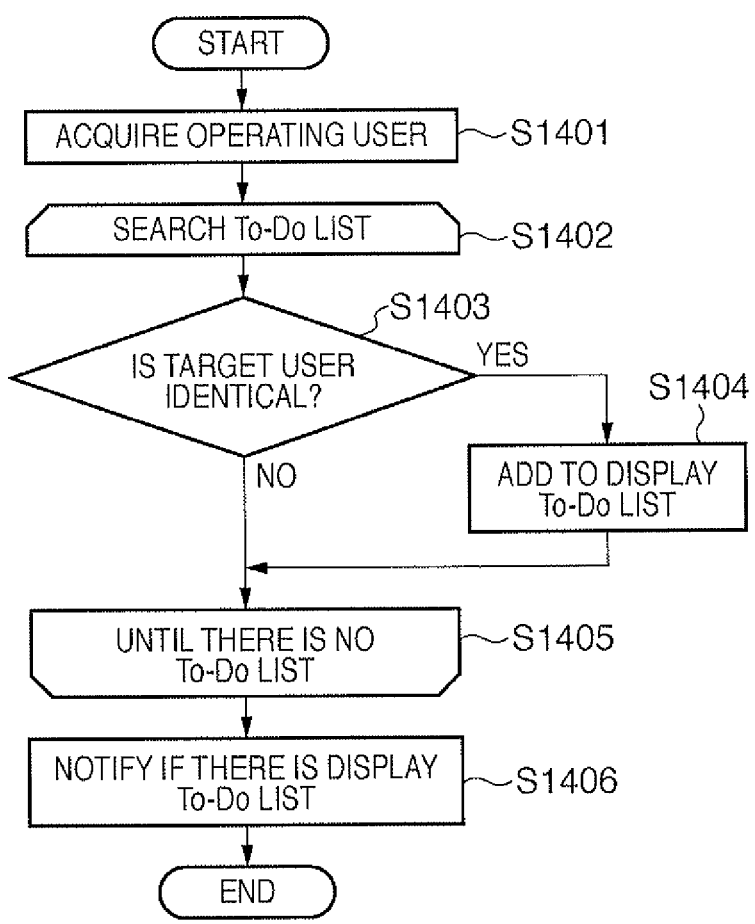
FIG. 14 is a flow chart showing a procedure of a display process of a conventional To-Do list.

A conventional To-Do list display method will be described with reference to FIGS. 14 and 15. The user first instructs to display the To-Do list through the user interface 1001. Receiving the user operation, the client software 1000 reports the operation execution users to the server software 1100. After receiving the operation execution users, the server software 1100 creates a To-Do list to be displayed in the document management control unit 1102.

The following process is executed in the document management control unit 1102. First, in response to the user operation, the operation execution users are acquired (step S1401). To-Do lists are then acquired one by one from the To-Do list database 1105, and the following process is executed between steps S1402 to S1405.

Whether the target users of the To-Do list are identical to the operation execution users is first checked (step S1403). If they are not identical, the next checking of To-Do list is performed. If they are identical, the process proceeds to step S1404.

If the comparison in step S1403 indicates they are identical, the To-Do list is set as a To-Do list to be displayed (step S1404). If there is one or more To-Do list in the To-Do list to be displayed after the process is executed for all To-Do lists, the list is returned to the client software 1000. If there is no list, that fact is returned to the client software 1000 (step S1406).

Figure 15:
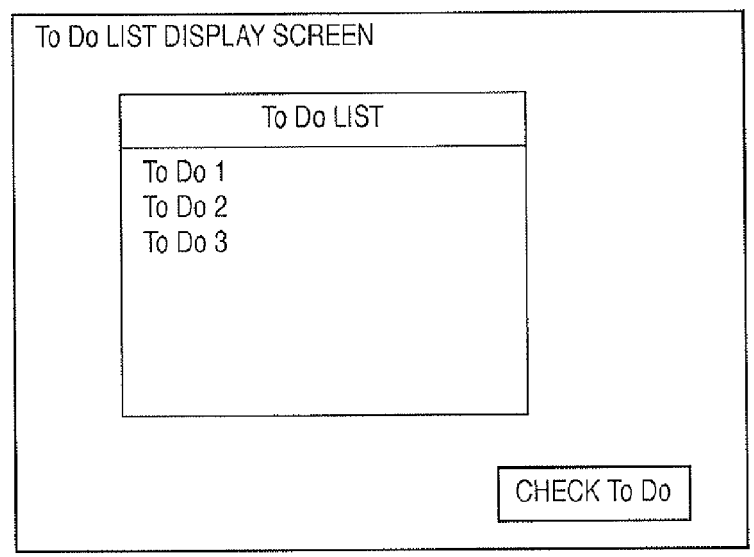
FIG. 15 is a diagram showing an example of a display screen of the conventional To-Do list.

In the conventional technique, after receiving the display To-Do list from the server software 1100, the client software 1000 presents the list to the user as shown in FIG. 15. In the conventional technique, the user can only check the details of the To-Do list on the To-Do list displayed as in FIG. 15.

Processes of the present embodiments will now be described.

First Embodiment

Figure 7:
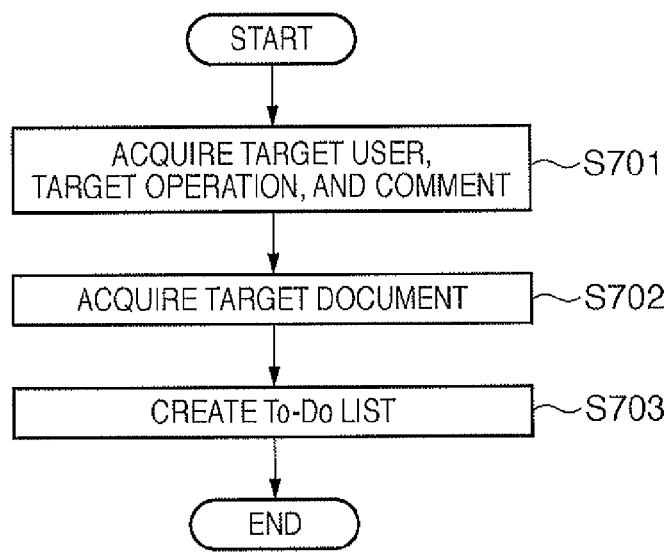
FIG. 7 is a flow chart showing a procedure of a creation process of the To-Do list according to the present embodiment.

A procedure of a To-Do list creation process in the present embodiment will now be described with reference to FIGS. 2, 3, 4, and 7. The steps in FIG. 7 are processed by the CPU 1601 in the client apparatus.

Figure 2:
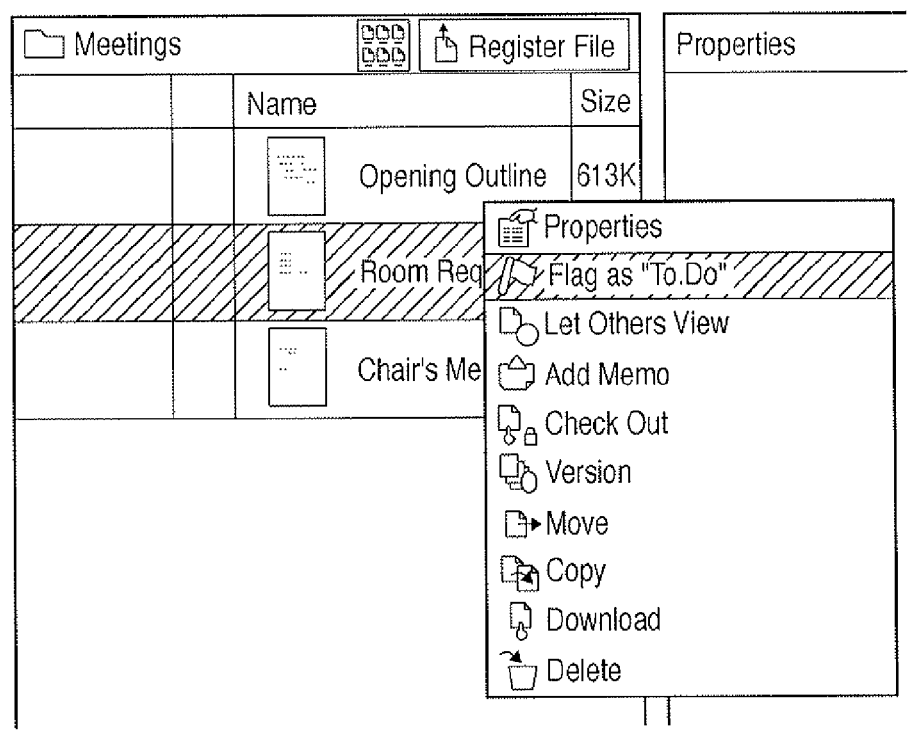
FIG. 2 is a diagram showing an example of a To-Do list creation instruction screen.

The user first selects documents through the client software 1000 as shown in FIG. 2 and instructs to create a To-Do list of the documents. After receiving the request of the user through the user interface 1001, the client software 1000 transmits the request to the server software 1100 through the communication control unit 1003.

Having received the request, the server software 1100 acquires a target operation list from the To-Do list database 1105 and a target user list from the user management database 1106 and returns the result to the client software 1000. After receiving the lists, the client software 1000 displays a To-Do list creation screen as shown in FIG. 3 to the user, the screen displaying a list of the target operations and the target users.

Figure 3:
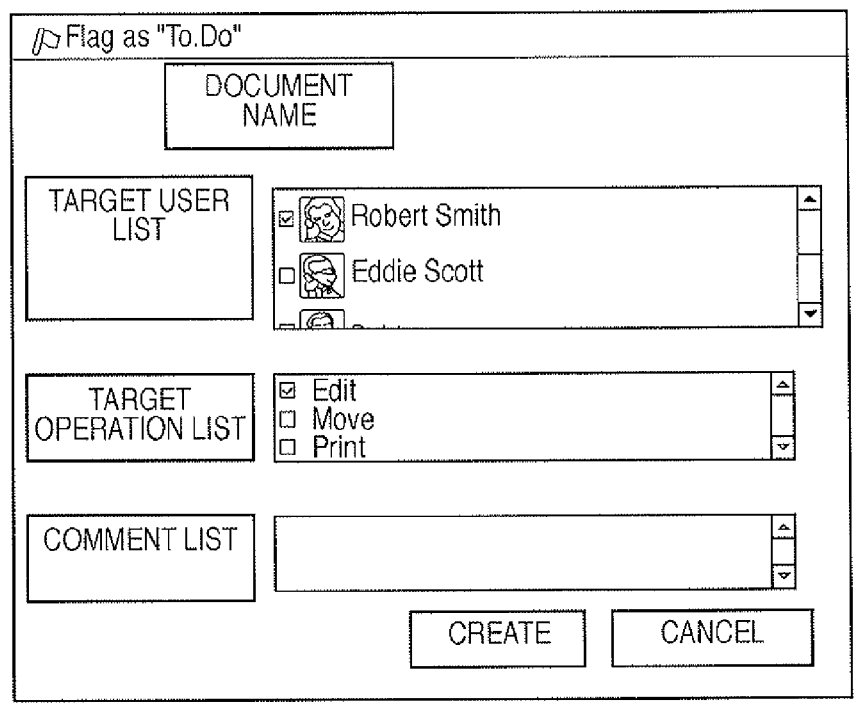
FIG. 3 is a diagram showing an example of a To-Do list creation screen.

As shown in FIG. 3, a target user list and a target operation list are added in the present embodiment as compared to FIG. 12. The user selects, for example, "User A" and "User B" in "Target User List" for the documents and selects "Edit" in "Target Operation List" as a target operation of the users. An instruction for modification, etc., is described in the comment field.

After the user selects the target users and the target operations, inputs a comment, and notifies that all input is finished, the client software 1000 receives the notification through the user interface 1001. Having received the notification, the client software 1000 generates a To-Do list in the To-Do list control unit 1004. The To-Do list control unit 1004 first acquires the target users, the target operations, and the comments (step S701). The To-Do list control unit 1004 then acquires the documents as operation targets (step S702).

The documents as operation targets are combined with the target users, the target operations, and the comments to generate a To-Do list (step S703). The client software 1000 transmits the generated To-Do list to the server software 1100 through the communication control unit 1003. The process in steps S701 to S703 is an example of list generation in the present embodiment. Meanwhile, the server software 1100 stores the received To-Do list in the To-Do list database 1105.

The target operation list displays "Edit", "Move Document", "Copy Document", "Delete Document", "Print", "Set Access Right", "Add Tag", etc. The To-Do list database created in the To-Do list database 1105 includes information as shown in FIG. 4. However, the target users and the target documents may be IDs that can uniquely identify the targets.

In the present embodiment, as shown in FIG. 3, the user can select target users and target operations from the lists on the To-Do list creation screen. In this way, the To-Do list can simply realize a workflow system for passing work from person to person.

The To-Do list control unit 1004 combines the documents in the To-Do list. Furthermore, as compared to FIG. 13, an item of target operation is added to the To-Do list database in the present embodiment as shown in FIG. 4. In this way, comments (To-Do) and personnel in an operation (workflow) for processing the documents can be set in association with the documents upon the creation of the To-Do list in the present embodiment. The setting can be executed in the check item as shown in FIG. 3, and the user can very simply perform the setting operation.

Figure 5:
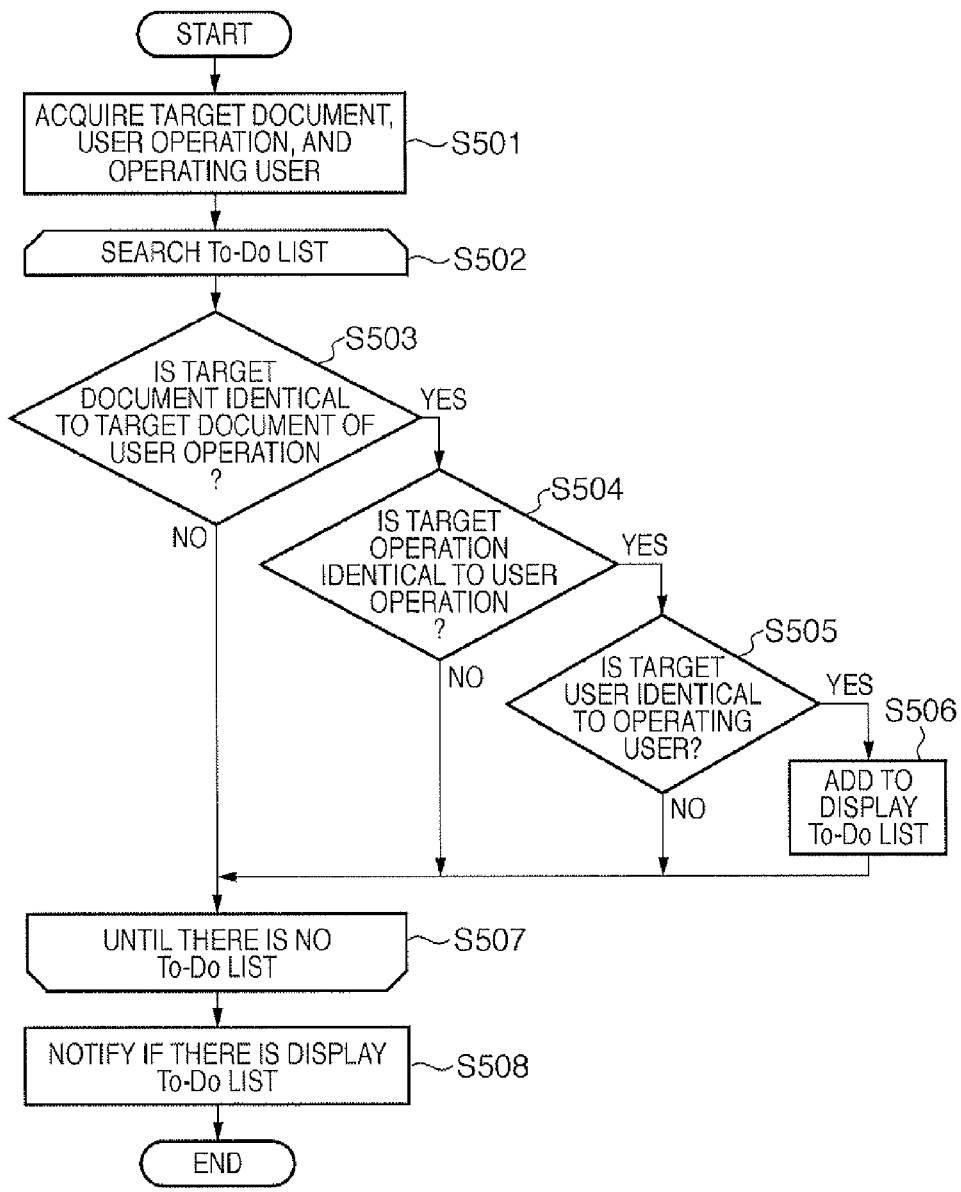
FIG. 5 is a flow chart showing a procedure of a display process of a To-Do list according to the present embodiment.

A To-Do list display method in the present embodiment will now be described with reference to FIGS. 5 and 6. In the present embodiment, after the To-Do list is generated according to the process shown in FIG. 7, the To-Do list is displayed on the screen of the client according to the process shown in FIG. 5 when the user performs an operation for the documents. The steps in FIG. 5 are processed by the CPU 1601 in the server apparatus.

The user first selects documents from the client software 1000 through the user interface 1001 and gives instructions for specific document operations for the documents. It is assumed here that an edit operation is selected. Having received the user operations, the client software 1000 transmits the user operations, the target documents, and the operation execution users to the server software 1100.

The server software 1100 creates a To-Do list to be displayed in the document management control unit 1102. A process as shown in FIG. 5 is executed in the document management control unit 1102. The server software 1100 first acquires the target documents, the user operations, and the operation execution users (step S501).

To-Do lists are acquired one by one from the To-Do list database 1105, and the following search process is executed in steps S502 to S507. Whether a target document of the To-Do list is identical to a target document of the user operation is determined (step S503). If they are not identical, a loop of steps S502 to S507 is repeated for the next determination of the To-Do list. On the other hand, if they are identical, the process proceeds to step S504.

Whether the target operation of the To-Do list is identical to the user operation is then determined (step S504). If they are not identical, the loop of steps S502 to S507 is repeated for the next determination of the To-Do list. On the other hand, if they are identical, the process proceeds to step S505.

Whether the target user of the To-Do list is identical to the operation execution user is then determined (step S505). If they are not identical, the loop of steps S502 to S507 is repeated for the next determination of the To-Do list. On the other hand, if they are identical, the process proceeds to step S506.

If all comparisons in the determinations of steps S503 to S505 are identical, the To-Do list is set as a To-Do list to be displayed (step S506).

After executing the process for all To-Do lists, if there is one or more To-Do list in the To-Do list to be displayed (display To-Do list), the list is transmitted to the client software 1000. If there is no list, that fact is transmitted to the client software 1000 (step S508).

Figure 6:
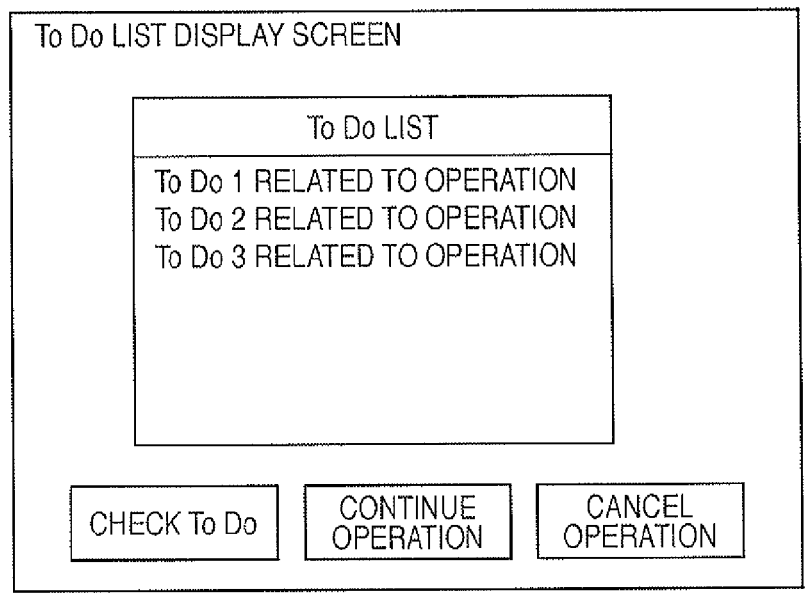
FIG. 6 is a diagram showing an example of a display screen of the To-Do list.

Having received the display To-Do list from the server software 1100, the client software 1000 presents the list to the user as shown in FIG. 6.

In the present embodiment, the user can select whether to advance the process, check details of the To-Do list, or to cancel a desired operation on the displayed To-Do list.

For example, in FIG. 6, the user can select "To-Do 1 Related to Operation" and press a button "Check To-Do" to check details of the To-Do list (such as an instruction for modification). The user can also press a button "Continue Operation" to advance the edit operation, etc. The user can also cancel a desired operation (such as edit operation) with a button "Cancel Operation".

As described, in the process (workflow) for editing the document, a To-Do list related to the operation is automatically displayed when the user edits the document. The user can advance the process according to, for example, the instruction described in the comment of the To-Do list. Therefore, the user does not have to treat the To-Do list in a different operation during the operation of the document management system. Furthermore, the To-Do list automatically opens in the operation of the document management system. Therefore, the leakage of the content (such as modification) that the user wants the target user to perform in the workflow can be prevented. Only the list related to the document operation is displayed in the To-Do list, and the user can efficiently advance necessary work.

A simple workflow system is realized by the To-Do list in the present embodiment. Therefore, a special configuration such as a workflow engine is not required, and a system for passing the work from person to person can be realized.

Second Embodiment

A second embodiment will now be described. In the present embodiment, even if there is a To-Do list associated with an operation similar to the operation desired by the user, that fact is notified to the user. In the present embodiment, a process for creating the To-Do list is the same as in the description of the first embodiment shown in FIG. 7.

A To-Do list display method in the present embodiment will be described with reference to FIGS. 8, 9, 10, and 11. In the present embodiment, a database (table) showing the relationship between the operations as shown in FIG. 8 is added and held in the To-Do list database 1105 of the first embodiment. As shown in FIG. 8, user operations and operations related to the user operations are associated.

The user first selects documents from the client software 1000 through the user interface 1001 and instructs specific document operations for the documents. It is assumed here that a document display operation is selected. Having received the user operation, the client software 1000 transmits the user operations, the target documents, and the operation execution users to the server software 1100.

Figure 9:
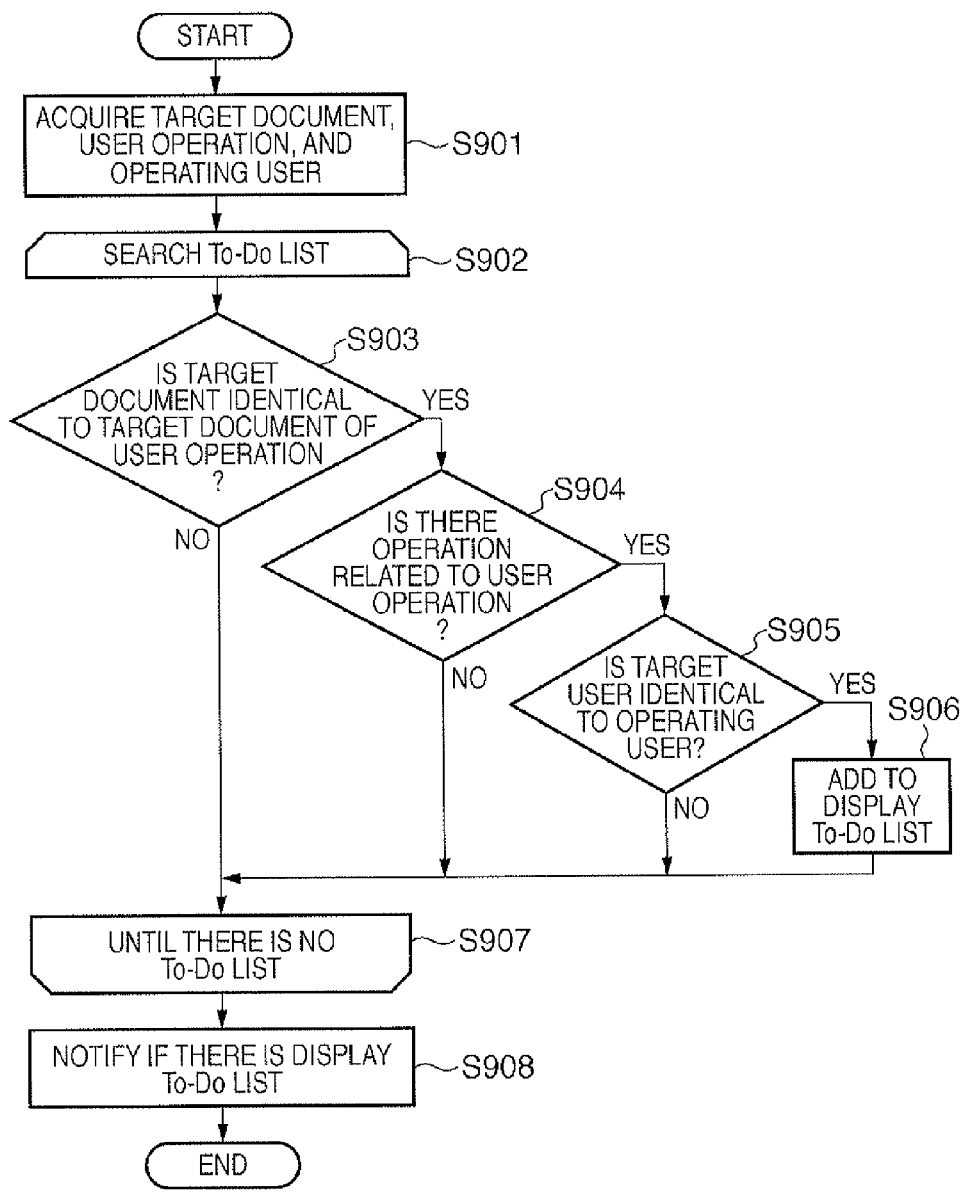
FIG. 9 is a flow chart showing a procedure of a display process of the To-Do list according to the present embodiment.

In the server software 1100, a To-Do list to be displayed in the document management control unit 1102 is created. The document management control unit 1102 executes a process as shown in FIG. 9. The steps in FIG. 9 are processed by the CPU 1601 in the server apparatus. The server software 1100 first acquires the target documents, the user operations, and the operation execution users (step S901).

To-Do lists are acquired one by one from the To-Do list database 1105, and the following search process is executed in steps S902 to S907. Whether a target document of the To-Do list is identical to a target document of the user operation is first determined (step S903). If they are not identical, a loop of steps S902 to S907 is repeated for the next determination of the To-Do list. On the other hand, if they are identical, the process proceeds to step S904.

Whether there is an operation related to the user operation is then determined. The database (FIG. 8) showing the relationship between the operations included in the To-Do list database 1105 is referenced to determine whether there is an operation related to the user operation (step S904). If there is no operation, a loop of steps S902 to S907 is repeated for the next determination of the To-Do list. On the other hand, if there is an operation, the process proceeds to step S905. The process of step S904 is an example of a second search in the present embodiment.

Whether the target user of the To-Do list is identical to the operation execution user is then determined (step S905). If they are not identical, the loop of steps S902 to S907 is repeated for the next determination of the To-Do list. On the other hand, if they are identical, the process proceeds to step S906.

If all comparisons in the determinations of steps S904 to S906 are identical, the To-Do list is set as a To-Do list to be displayed (display To-Do list) (step S906).

After executing the process for all To-Do lists, if there is one or more To-Do list in the display To-Do list, the operation related to the list is transmitted to the client software 1000. If there is no list, that fact is transmitted to the client software 1000 (step S908).

As described, in the present embodiment, whether the target related operation (such as editing) is identical to the user operation serves as the determination condition in the display process of the To-Do list when the target user who processes an operation (workflow) including the document executes one process (such as displaying).

In step S904 shown in FIG. 9, the determination process of step S504 shown in FIG. 5 may be added to determine whether the target operation is identical to the user operation.

A To-Do list display method in the present embodiment will now be described with reference to FIG. 11. Having received the display To-Do list from the server software 1100, the client software 1000 determines whether there is a To-Do list in a related operation (step S1101). If there is no list, the operation desired by the user is executed (step S1104), and the present process ends.

Figure 11:
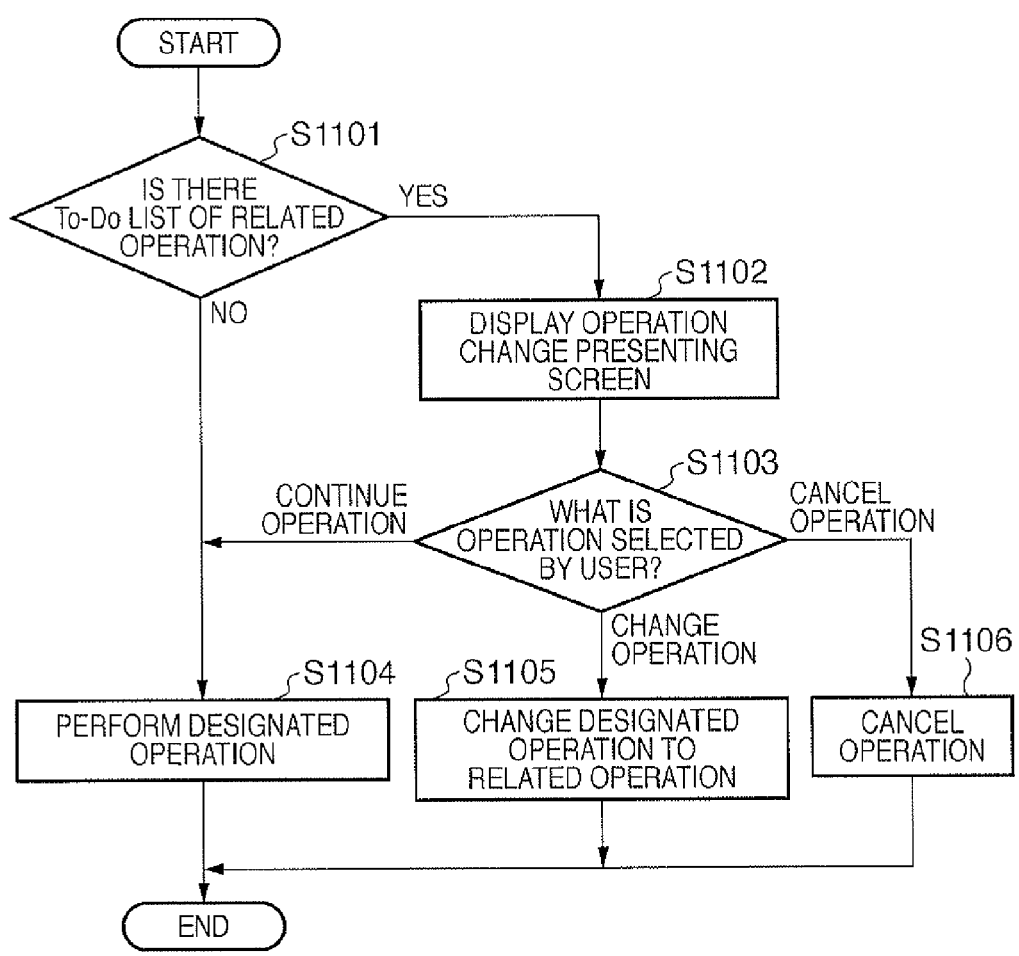
FIG. 11 is a flow chart showing a procedure of an operation change process according to the present embodiment.

FIGS. 10 and 11 are realized in step S904 as an example of the second search. In the present embodiment, FIGS. 10 and 11 illustrate an example of "second display". The steps in FIG. 11 are processed by the CPU 1601 in the client apparatus.

On the other hand, if there is a To-Do list in a related operation, that fact and the list are presented to the user as shown in FIG. 10 (step S1102). The user can advance the process of the current operation, switch to the presented operations, or cancel the current operation on the displayed To-Do list.

For example, it is assumed that the screen shown in FIG. 10 is displayed when the user is performing a display operation. In that case, the user can advance the process (displaying) with a button "Continue Operation" shown in FIG. 10. The user can also switch the operation to a presented operation (for example, "Edit" set to To-Do 1 of Related Operation) with a "Change Operation" button. The user can also cancel the desired operation with a button "Cancel Operation". Thus, the user can select the current user operation and operations related to the operation in the present embodiment.

If "Continue Operation" is determined in step S1103, the user performs the desired operation (step S1104), and the process ends.

If "change operation" is determined in step S1103, the user changes the desired operation to an operation associated with the To-Do list (step S1105), and the process ends.

If "Cancel Operation" is determined in step S1103, the user cancels the desired operation (step S1106), and the process ends.

As described, according to the present embodiment, when a document operation designated by the user is performed, a To-Do list of operations related to the document operation is automatically displayed. Therefore, for example, the user can advance the process according to an instruction described in a comment of the To-Do list of the designated document operation and can also advance the process according to an instruction described in a comment of the To-Do list of related operations.

In the present embodiment, FIG. 6 may be displayed as in the first embodiment if there is no operation related to the user operation and there is an identical target operation when the determination process of step S504 shown in FIG. 5 is added to step S904 shown in FIG. 9.

If both the related operation and the identical target operation exist, both FIGS. 6 and 10 may be displayed, or one screen may display the operations.

Other Embodiment

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-273401, filed Oct. 23, 2008 which is hereby incorporated by reference herein in its entirety.

What is claimed is:

1. A document management apparatus comprising:
   a managing unit configured to manage first data including first document information of a first document, first user information regarding a first user, first operation information regarding a first operation to be executed for the first document by the first user, and a comment for the first user, wherein the first data is set by a first client apparatus, and wherein the first document information, the first user information, the first operation information and the comment are associated with one another;
   an acquiring unit configured to acquire a notification transmitted from a second client apparatus when a second user operates a second document in the second client apparatus, wherein the notification indicates second document information of the second document, second user information regarding the second user, and second operation information regarding a second operation instructed for the second document by the second user;

a search unit configured to search for first data managed by the managing unit based on the notification transmitted from the second client apparatus, wherein the search unit searches for first data in which the first document information included in the searched-for first data is identical to the second document information indicated by the notification, the first operation information included in the searched-for first data is identical to the second operation information indicated by the notification, and the first user information included in the searched-for first data is identical to the second user information indicated by the notification; and a display control unit configured to control the second client apparatus to display the comment included in the first data found by the search of the search unit.

2. An apparatus according to claim 1, wherein the first operation and the second operation respectively include at least one of editing, moving, copying, deleting, printing, setting of an access right, and adding of a tag.

3. An apparatus according to claim 1, wherein the managing unit manages the first data in which a related operation is associated with the first operation, and said display control unit controls the second client apparatus to further display information based on the related operation.

4. A document management method executed by a document management apparatus, the method comprising:

managing first data including first document information of a first document, first user information regarding a first user, first operation information regarding a first operation to be executed for the first document by the first user, and a comment for the first user, wherein the first data is set by a first client apparatus, and wherein the first document information, the first user information, the first operation information and the comment are associated with one another;

acquiring a notification transmitted from a second client apparatus when a second user operates a second document in the second client apparatus, wherein the notification indicates second document information of the second document, second user information regarding the second user, and second operation information regarding a second operation instructed for the second document by the second user;

searching for first data managed by the managing step based on the notification, wherein the searching step searches for first data in which the first document information included in the searched-for first data is identical to the second document information indicated by the notification, the first operation information included in the searched-for first data is identical to the second operation information indicated by the notification, and the first user information included in the searched-for first data is identical to the second user information indicated by the notification; and controlling the second client apparatus to display the comment included in the first data found by the search of the searching step.

5. A non-transitory computer-readable storage medium that retrievably stores a document management program that, when executed by a document management apparatus, causes the document management apparatus to perform a document management method, the method comprising:

managing first data including first document information of a first document, first user information regarding a first user, first operation information regarding a first operation to be executed for the first document by the first user, and a comment for the first user, wherein the first data is set by a first client apparatus, and wherein the first document information, the first user information, the first operation information and the comment are associated with one another;

acquiring a notification transmitted from a second client apparatus when a second user operates a second document in the second client apparatus, wherein the notification indicates second document information of the second document, second user information regarding the second user, and second operation information regarding a second operation instructed for the second document by the second user;

searching for first data managed by the managing step based on the notification, wherein the searching step searches for first data in which the first document information included in the searched-for first data is identical to the second document information indicated by the notification, the first operation information included in the searched-for first data is identical to the second operation information indicated by the notification, and the first user information included in the searched-for first data is identical to the second user information indicated by the notification; and controlling the second client apparatus to display the comment included in the first data found by the search of the searching step.

* * * * *